R. W. LINDHÉ.
CLAMPING SLEEVE FOR BALL BEARINGS AND THE LIKE.
APPLICATION FILED MAY 22, 1919.
1,334,620. Patented Mar. 23, 1920.
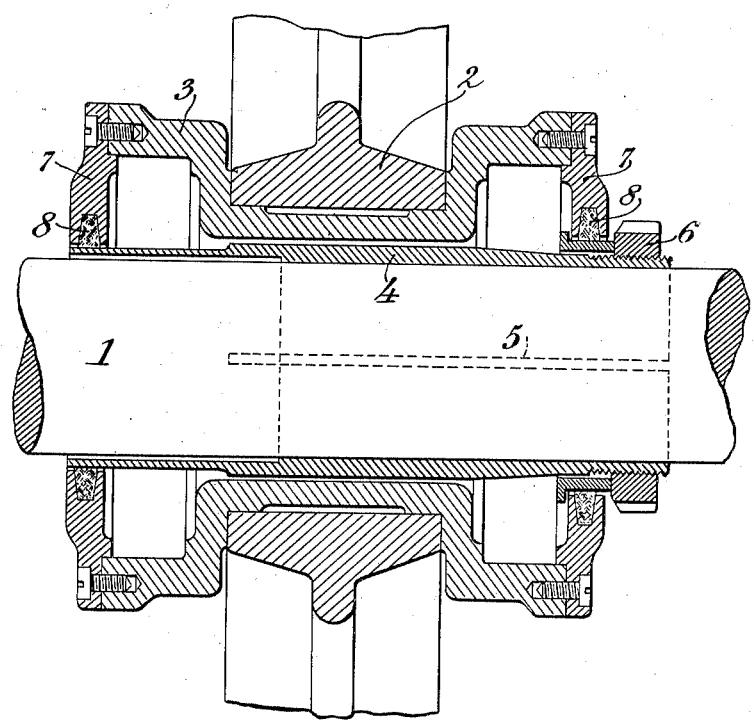
INVENTOR
Roland Wallace Lindhé
BY
Fraser, Durk & Myers
ATTORNEYS

UNITED STATES PATENT OFFICE.

ROLAND WALLACE LINDHÉ, OF STOCKHOLM, SWEDEN, ASSIGNOR TO AKTIEBOLAGET SVENSKA KULLAGERFABRIKEN, OF GOTTENBORG, SWEDEN, A CORPORATION OF SWEDEN.

CLAMPING-SLEEVE FOR BALL-BEARINGS AND THE LIKE.

1,334,620.  Specification of Letters Patent.  Patented Mar. 23, 1920.

Application filed May 22, 1919. Serial No. 299,010.

*To all whom it may concern:*

Be it known that I, ROLAND WALLACE LINDHÉ, a subject of the King of Sweden, residing at Stockholm, in the Kingdom of Sweden, have invented a new and useful Improvement in Clamping-Sleeves for Ball-Bearings and the like, of which the following is a specification.

The present invention relates to a clamping sleeve for securing ball bearings and the like to a shaft. The clamping sleeve is particularly intended to be used in such cases where two ball bearings are to be placed at some distance from one another, as for instance when a loose pulley is to be mounted on a transmission shaft. The loose pulley is journaled on the shaft by means of two radial bearings placed beside one another. In such cases it has heretofore been customary to provide each bearing with a separate clamping sleeve with the result, however, that the nuts on the clamping sleeves project a considerable distance beyond the bearings at both sides. This arrangement is unsuitable, however, if, as it is often the case, a fast pulley is to be mounted on the shaft immediately up to the loose pulley. Since the faces of the pulleys should be located close to one another, whereas the distance between their central planes is dependent on the axial extension of the journaling device for the loose pulley, the result will in many cases be an unnecessarily wide face of one of the pulleys or of both pulleys, that is to say, the cost of the pulleys is increased. Furthermore, the mounting of the two bearings and their clamping sleeves at the definite distance is time-wasting and inconvenient and requires the erector to be experienced, in order to attain a satisfactory result.

The purpose of the clamping sleeve forming the subject of the present invention is to avoid the said inconveniences. For this purpose the clamping sleeve is principally characterized by this that it is of such length that it is capable of supporting the inner races of two ball bearings placed at some distance from one another, one end of the sleeve being slotted in well-known manner and being slightly conical and provided with a nut, whereas the opposite end, which is not slotted, has an inner diameter slightly larger than the shaft, so that at this end the sleeve is not contacting with the shaft. The sleeve being thus provided with a nut only at one end it will not be difficult to place a fast pulley close up to the loose pulley.

A journaling device for a loose pulley provided with such a clamping sleeve is shown in longitudinal section in the accompanying drawing as an example of the invention.

In the drawing, 1 denotes the shaft and 2 the hub of the loose pulley which is secured to a bearing casing 3 supported by two ball bearings, which are not shown in the drawing. The inner races of the ball bearing are secured to the shaft 1 by means of a common clamping sleeve 4. One end of the sleeve—the right-hand end in the drawing—is slightly conical in ordinary manner and is provided with a slot or cut 5 and with a nut 6 located outside the casing, by the tightening of which nut the sleeve may be secured to the shaft. The other end of the sleeve, which supports the left-hand bearing, is not slotted but has a slightly larger diameter than the shaft so as not to bear against the shaft. The inner race of the left-hand ball bearing may therefore easily be driven onto the said end of the sleeve, after which the sleeve is pushed onto the shaft and secured by tightening the nut. The cut 5 extends from the right-hand end of the sleeve a distance beyond the point where the inner diameter of the sleeve is increased, so that the sleeve may easily slide on the shaft when the nut 6 is not tightened.

The casing 3 is provided in the ordinary manner at both ends with lids 7 with packing rings 8 for preventing dust and dirt from entering the bearings.

It will be understood from the drawing that with the described construction of the clamping sleeve no nut is required outside the left-hand ball bearing, on account of which there is nothing to prevent a fast pulley from being placed as close up to said bearing as the lid of the casing will permit. Furthermore, the advantage is attained by the construction described that the journaling device may be supplied as a complete unit and that it may be mounted and dismounted without having to detach its various parts, by merely tightening or loosening the single nut 6 located outside the casing. Inspection of the nut 6 is facilitated by said nut being placed outside the casing, so that there is no risk of the journaling device loosening.

I claim:

1. A clamping sleeve for securing ball bearings and the like to a shaft having such length as to be capable of supporting the inner races of two ball bearings located at a distance from one another, one end of said sleeve being slotted and slightly conical and provided with screw threads for receiving a nut and its other end having a slightly larger inner diameter than the shaft.

2. A clamping sleeve for securing ball bearings and the like to a shaft having such length as to be capable of supporting the inner races of two ball bearings located at a distance from one another, one end of said sleeve being slightly conical and provided with screw threads for receiving a nut and its other end having a slightly larger inner diameter than the shaft, said sleeve having a slot extending from its conical end a distance beyond the point where the inner diameter of the sleeve is increased.

ROLAND WALLACE LINDHÉ.